United States Patent

Neidell et al.

[11] Patent Number: 4,571,710
[45] Date of Patent: Feb. 18, 1986

[54] SEISMIC METHOD FOR IDENTIFYING LOW VELOCITY SUBSURFACE ZONES

[76] Inventors: Norman S. Neidell, 13054 Taylorcrest, Houston, Tex. 77079; Ernest E. Cook, 11711 Memorial Dr. #153, Houston, Tex. 77024

[21] Appl. No.: 413,428

[22] Filed: Aug. 31, 1982

[51] Int. Cl.$^4$ .............................................. G01V 1/30
[52] U.S. Cl. ........................................ 367/38; 367/70
[58] Field of Search ...................... 367/40, 59, 63, 68, 367/70, 71, 73, 60, 38, 50, 52

[56] References Cited

U.S. PATENT DOCUMENTS

| | | | |
|---|---|---|---|
| 3,662,325 | 5/1972 | Savit | 367/70 |
| 3,668,618 | 6/1972 | Quay | 367/68 |
| 3,899,768 | 8/1975 | Quay et al. | 367/68 |
| 4,008,459 | 2/1977 | Walker, Jr. | 367/56 |
| 4,298,966 | 11/1981 | Ruehle | 367/50 |

*Primary Examiner*—Salvatore Cangialosi
*Assistant Examiner*—K. R. Kaiser
*Attorney, Agent, or Firm*—Gunn, Lee & Jackson

[57] ABSTRACT

This invention consists of producing a two-dimensional display from exploration seismic data designed to indicate zones of anomalous low velocity in the subsurface. Such zones may be indicative of porosity and the possible occurrence of hydrocarbons. They will be localized in terms of position along the seismic profile and in approximate zone of reflection arrival time. Data used in making the display are derived from both the CDP stacked seismic profile and corresponding velocity analyses used also to stack the data itself. Stacking velocity curves are plotted according to CDP location for each reflector designated by an interpreter to be of interest. These curves are overlain in pairs using calibration calculations and empirical criteria. Calibration helps smooth "noisy" values and compensates for velocity variations resulting from changes in separation or dip of the two reflectors from which the overlain velocity curves derive. In addition, it is presumed that the interval bracketed by each reflector pair taken in turn has uniform or only regional lateral variations of interval velocity—no local lateral variation is assumed. "Cross overs" or convergences of the paired curves thus indicate zones of either high or low interval velocity of local nature. The display itself consists of the velocity curves for all possible reflector pairs and vertical bands of color which are assigned to identify the reflection interval of particular low velocity zones which are shown consistently by all reflectors taken in pairs which bracket such zones. Horizontal position is of course indicated by the CDP location.

14 Claims, 6 Drawing Figures

1- CURVE FOR SHALLOWEST REFLECTOR
2-
3- } INTERMEDIATE REFLECTORS
4-
5- CURVE FOR DEEPEST REFLECTOR
----- DEEPER REFLECTOR CURVE OF PAIR
——— SHALLOWER REFLECTOR CURVE OF PAIR
(PREDICTION OF DEEPER REFLECTOR)

1- CURVE FOR SHALLOWEST REFLECTOR
2-
3- } INTERMEDIATE REFLECTORS
4-
5- CURVE FOR DEEPEST REFLECTOR
------ DEEPER REFLECTOR CURVE OF PAIR
────── SHALLOWER REFLECTOR CURVE OF PAIR
(PREDICTION OF DEEPER REFLECTOR)

SEISMIC METHOD FOR IDENTIFYING LOW VELOCITY SUBSURFACE ZONES

BACKGROUND OF THE INVENTION

1. Field of the Invention

This invention relates to a method of detecting possible porosity zones in the subsurface from seismic velocity data and presenting results on a two-coordinate display indicating spatial positions and depths with a color coding corresponding to the depth interval of the zones.

2. Background of the Invention

The reflection technique of seismic exploration in principle involves the generation of an elastic wave at the near surface which penetrates the earth and is partially reflected back to the surface by the boundaries between successive geologic formations in depth which differ in their density-velocity (acoustic impedance). The reflections are detected by instruments placed on the surface at varying distances from the source of the initial wave. From such detectors the times needed by the wave to travel down through the earth and return after being reflected by each formation boundary at varying depths and possibly having differing dips are recorded, as are any modifications to the waveform.

In practice the seismic waves are initiated at a succession of regularly spaced points (shot points) along the line of survey, and recordings as described are made for each shotpoint. According to such procedure, many of the recording locations are used several times with the source at different locations. Hence this approach is known a "multiple ground coverage" and leads to use of the "CDP" or common-depth-point method developed originally by W. H. Mayne (Common reflection point horizontal data stacking techniques, Geophysics Vol. 27, 1.927–938, 1962). This is an imaging technique which simulates data from a coincident source and detector at the surface using "views" of essentially the same area in the subsurface from different angles as produced by the different source to detector separations. All the recordings in a CDP collection share a common symmetry point at the surface between the source and detector. Profiles of CDP stacked data are usually displayed as vertically plotted wiggle traces along a section with the horizontal axis being the location of the particular synthesized coincident source/detector position and the vertical axis being the two-way travel time of the reflections which are now enhanced by the summing process inherent in the stacking.

The multiple ground coverage view of the subsurface supplied by the survey when combined or stacked according to CDP imaging to form the profile requires the use of stacking velocities. These velocities are derived from an analysis which determines the two parameters which mathematically describe each hyperbolic trajectory corresponding to a reflection event in the trace collections going into the CDP stack. One parameter of the hyperbola is the stacking velocity while the other is the stacking or normal incidence time for the particular event as it will appear on the resulting CDP stacked trace. (See M. T. Taner and F. Koehler, "Digital Computer Deviation and Applications of Velocity Functions", Geophysics, Vol. 34, No. 6, 11-859-881, 1969).

Another relatively common format for displaying seismic data starts with the CDP stacked seismic section which is then further processed to approximate vertical traces of relative or absolute velocity as functions of two-way travel time. Varying colors which relate to the velocities of the geologic formations are then often superimposed to present such information for interpretation. Examples of this kind of display are the SHADCON TM * and Seislog TM ** sections produced on the Applicon ink jet plotter (Applicon, Inc., a subsidiary of Schlumberger, 32 2nd Avenue, Burlington, Mass. 01803).

*Trademark Western Geophysical Company of America, A Litton Company
**Trademark Teknica Resource Development Ltd., Alberta, Canada This type of color display also aids in the detection of low velocity zones in the subsurface but does not make direct use of moveout curves in the CDP gathers. Hence this previously available type of display in conjunction with the one described by this invention offer more certainty and precision in the detection and localization of velocity anomalies in the subsurface.

SUMMARY OF THE INVENTION

The object of this invention is to provide a display for identifying zones of low subsurface velocity which may indicate porosity.

The specific method involves tracking particular reflectors horizontally along stacked seismic data. Arrival times of these reflectors are determined for every shotpoint or every other CDP position. Using such times, the same reflectors can be tracked also on appropriate velocity analysis displays which have been computed for at least every other CDP point along the seismic profile. For each time corresponding to a reflector of interest a stacking velocity is picked and plotted according to its CDP or shot point number, preferably on the same horizontal scale as the seismic section and with a velocity scale increasing downward.

Each of the velocity plots are then overlain one on another in pairs in order to bracket all possible zones between the reflectors of interest. The process of overlay is designed to predict the deeper velocity based on an intervening uniform or slowly varying regional velocity and may include a semi-empirical alignment to compensate for any development of discordant dips between two reflectors as well as some smoothing for presence of noise. The overlain pairs are arranged such that when the measured stacking velocity curve from the deeper reflector approaches or rises above the value predicted for it from the shallower reflector this may be easily identified and should indicate an intervening anomalous low velocity occurrence.

For any two reflectors which are closely spaced in arrival time (usually intervals of 1000 feet or less) a quantitative calibration or prediction procedure may be used to overlay the pairs of plots. First the interval velocity between the two reflectors is calculated according to the Dix equation (See Sheriff, R. E., *Encyclopedic Dictionary of Exploration Geophysics*, Soc. of Expl. Geophys, Tulsa, 266P, 1973.) using the stacking velocity-normal incidence travel time pairs picked from the velocity analyses on a shotpoint by shotpoint basis. This gives actual but noisy estimates of interval velocities. Lateral running averages across 3, 5, 9, and 15 terms are then calculated to smooth these velocities. Both the actual interval velocities and smoothed averages are plotted by shotpoint or CDP locations for comparison and further analysis.

Another set of calculations is performed in connection with this calibration step which gives estimated or predicted deeper stacking velocities from the shallower stacking velocities of the particular curve pair bracketing an interval of interest. The predictions assume there are no anomalous zones between the two reflecting boundaries and use in turn the Dix interval velocities and their smoothed valves. Plots of the smoothed interval velocities are compared to the plots of the "raw" Dix interval velocities. From these displays calibration "points" or key points of consistency are determined empirically and these can be used to align the pairs of graphs of the stacking velocities despite discordant dips and to give emphasis to the likely low local velocity anomalies.

The pairs of velocity curves predicted and measured should track each other (after the described adjustments) in good approximation unless some zone between the two reflectors contains a porous zone or other material change which could cause an anomalously high or low velocity as referred to the averages used in the calibration step. A possible anomalous low velocity is signaled by either a curve convergence or crossover, where the deeper velocity curve approaches or rises above the prediction using the shallower one. This may indicate porosity and for pronounced effects, porosity containing gas. Once a zone of probable porosity is indicated by its velocity effect, an attempt is made to corroborate its validity by demonstrating that the anomaly is shown consistently by all reflector velocity curve pairs which bracket the zone of special interest.

All curve pairs used for a particular seismic profile are plotted on one display. The pairs are aligned vertically starting with the pairs which bracket the shallowest interval. Pairs are arranged according to reflection arrival time with the curve for the shallowest reflector combined first with the next deepest reflector, then the next deepest reflector and so on. After the deepest reflector has been used, a similar sequence is initiated starting with the next arriving reflections. This process continues until all possible combinations are included on the display.

The objective of this display is to make zones of anomalous low velocity easily recognizable by their vertical alignment and consistency over all the intervals which contain them. All crossover or convergence zones in each individual combination pair which show possible anomalous low velocity are marked with one color—usually red—so that they are readily identified. Vertical alignments of anomalous zones are color coded (usually other than red) according to the inter-reflector interval in which they occur.

Next a calculation determines the "aperture" with respect to the particular seismic spread length and the thickness of the interval between the reflector pairs in each combination. A length is derived which indicates the width in feet below which the basic method is unlikely to reliably resolve an anomaly. A dashed horizontal line with each dash corresponding to this distance is placed below each curve combination pair on the final display for reference purposes. Intelligent use of the appearance of an anomaly through different apertures can give important clues as to whether the anomalous zone lies below the vertically standing plane of the seismic profile or is in fact laterally in whole or part out of such plane.

BRIEF DESCRIPTION OF THE DRAWINGS

So that the manner in which the above-recited features of the present invention will become apparent, and the way in which they are attained can be understood in detail, the appended drawings which form a part of this specification will be described. The illustrated embodiments and the above brief summary convey all the particulars of the invention.

It is to be noted, however, that the appended drawings illustrate only typical embodiments of the invention and are therefore not to be considered limiting of its scope, for the invention may admit to other equally effective embodiments.

IN THE DRAWINGS

The present invention, both as to is organization and manner of operation, together with further objects and advantages thereof may best be understood by way of illustration and example of certain embodiments when taken in conjunction with the accompanying drawings in which.

DETAILED DESCRIPTION OF THE PREFERRED EMBODIMENT

Figure 1:
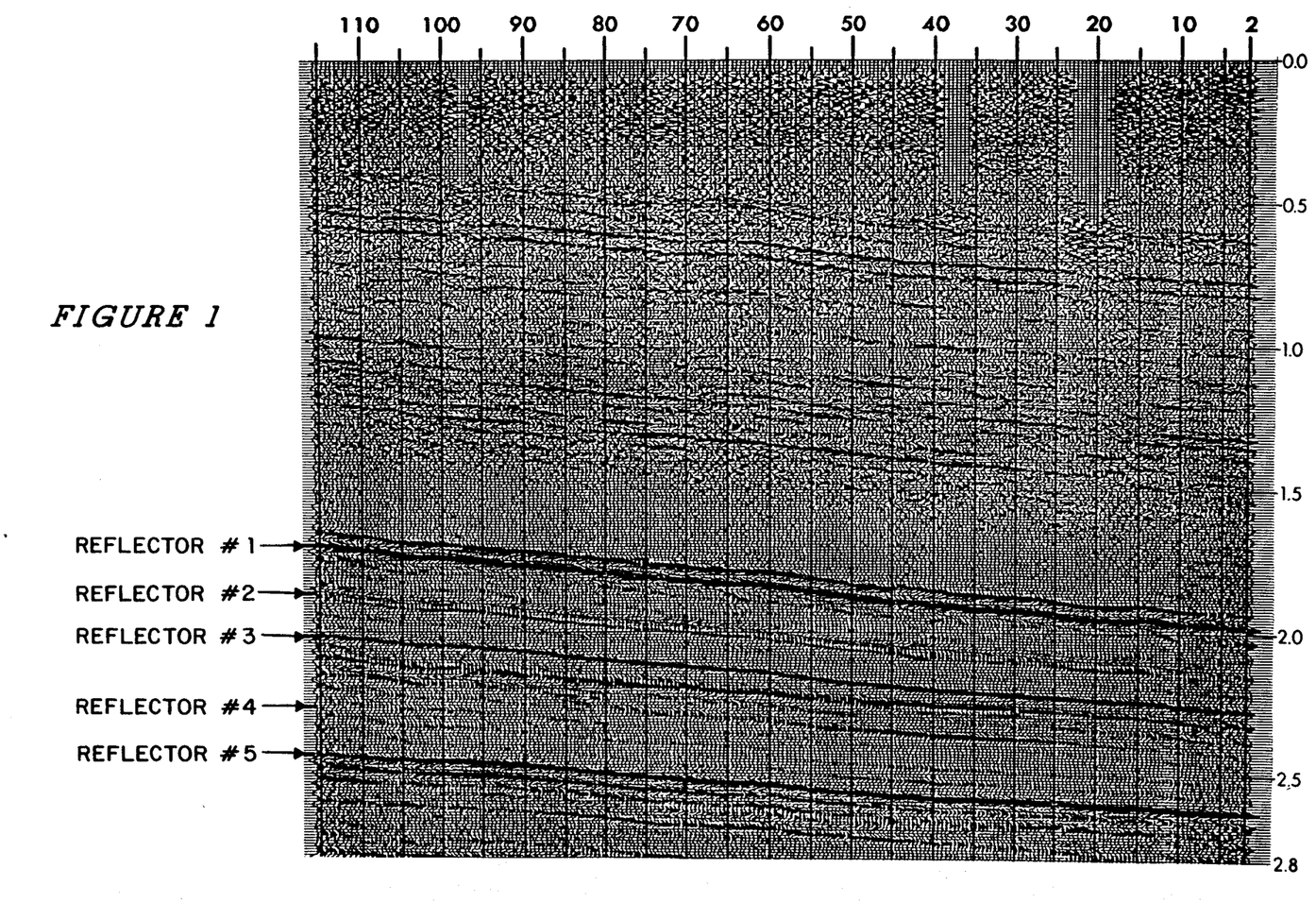
FIG. 1 is a CDP stacked seismic profile.

Referring now to the drawings and first to FIG. 1, there is shown a typical CDP stacked seismic profile. The vertical axis is the two-way travel time of a reflection measured in seconds. In this case the time coordinate ranges from 0.0 seconds to 4.0 seconds. The horizontal axis represents the lateral distance along the survey line in CDP increments which are the particular locations for coincident source/detector positions, as synthesized by that method and as previously discussed. Each vertically oriented wiggle trace positioned along the horizontal axis represents the CDP data sampling denoted by shot point number in this case with numbers ranging from 105 at the left to shotpoint 160 on the right. The prominent, and visually coherent horizontal lineations seen on this profile represent reflections off the interfaces between geologic formations and in this way give a view of the subsurface structural "relief" or geometry. Examples of strong reflections are seen on FIG. 1 at approximately 1.7 seconds and 2.6 seconds.

The gathering of seismic reflection field data using the CDP technique and its standard processing is well known and is described in detail by Professor Milton B. Dobrin in his book *Introduction to Geophysical Prospecting* (McGraw Hill, 1952) to name just one common reference.

Figure 2:
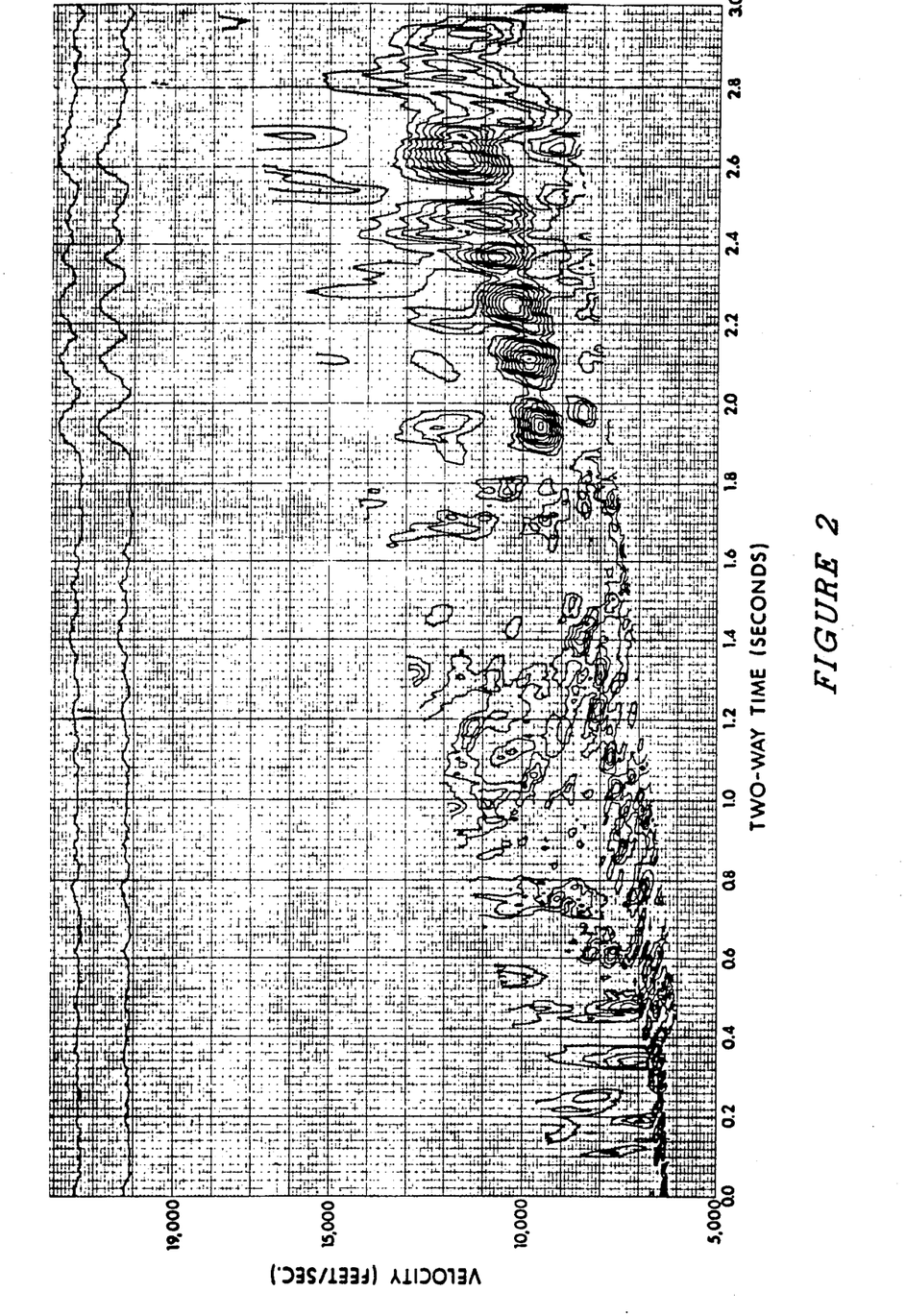
FIG. 2 is a contoured velocity analysis of a type suitable for determination of stacking velocities.

The method used in this invention involves tracking continuous reflections over lateral distances across a CDP seismic profile such as that shown in FIG. 1. The particular reflections to be tracked are selected because they represent tops or bottoms of zones of geologic interest or else because they bracket such zones. They are chosen on the basis of interpretability and lateral continuity. The more continuous seismic reflections usually also provide for better or more interpretable data on the seismic stacking velocity analyses as shown in FIG. 2. Two-way travel times for reflections of interest are noted on a shot point by shot point basis (or CDP point basis as appropriate) for all reflection events that are tracked.

Referring again to FIG. 2, there is illustrated an example of a contour type velocity analysis. Along the vertical axis is a stacking velocity scale measured in feet/second. The range of values for this particular display is from 5,000 to 19,000 feet/second. The horizontal scale measures two-way reflection time in seconds—in this case from 0.0 seconds to 3.0 seconds. The theory underlying such analyses is well known and discussed in some detail in the previously cited reference by Dobrin. The usual basis of the velocity analysis consists of a large number of trial or test fittings of a CDP collection of traces with hyberbolic move-out curves representing a sampling of the appropriate range of stacking time and stacking velocity. In FIG. 2, the analysis display shows the collective results of such test fits as a "map" of goodness-of-fit using some coherence measure. Pronounced contour closures denote the primary reflection events and the centroids of such closures have as coordinates the desired stacking parameters needed by the CDP approach.

It is also known that abrupt lateral changes in the subsurface lithology distort stacking velocities determined for reflections at depth below them, hence making the relation of stacking velocities to interval velocities quite complex. Zones of porosity (possibly hydrocarbon-filled porosity) are likely to have a slower stacking velocity as picked from such an analysis for the reflectors below such zone than would be seen where little or no lateral velocity change occurs. For subsurface geometries which are relatively simple (flat layers, conformable dipping surfaces, etc.), stacking velocities bear fairly straight forward relationships to interval velocities. In fact, the magnitudes of stacking velocities usually relate quite directly to the lithology, these magnitudes increasing as one goes typically from shales and sands to sandstones and limestones and then dolomite. In all circumstances however, a rock of reservoir quality will show a reduced velocity as compared to that same rock without appropriate porosity. Where gas is the pore fill fluid, the velocity reduction is further emphasized.

Figure 3:
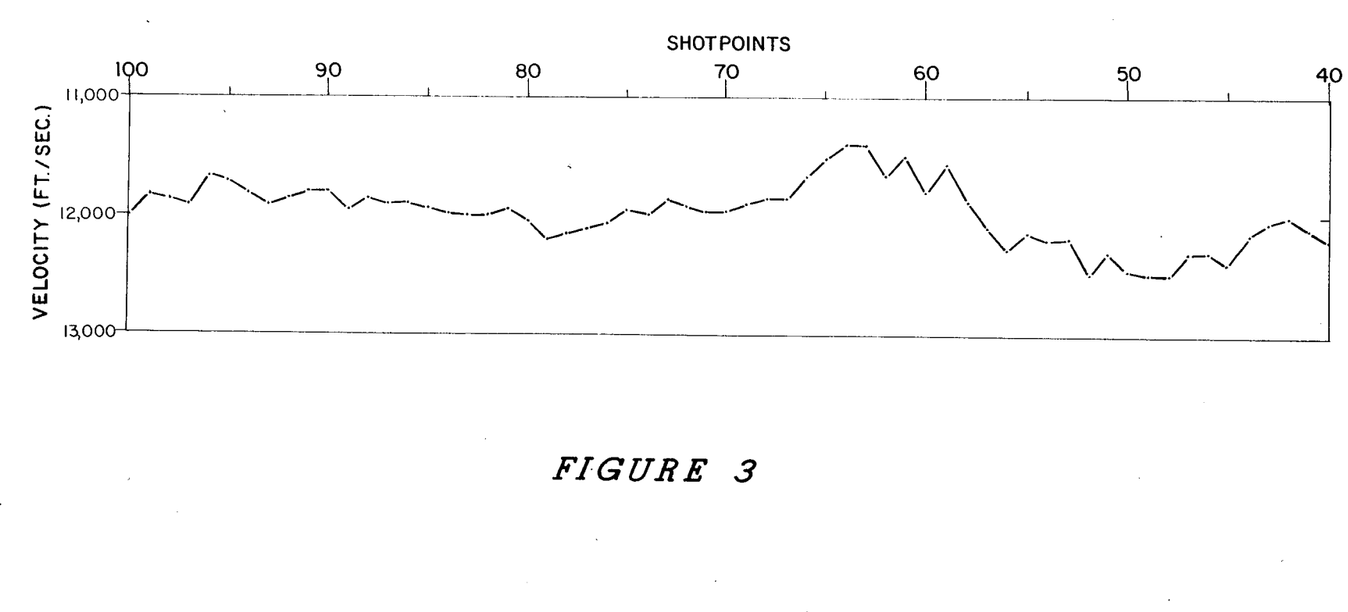
FIG. 3 is an individual plot of reflector number 5 of FIG. 1 stacking velocity curve having a horizontal axis corresponding to shotpoints or CDP's along the seismic profile and a vertical axis corresponding to stacking velocity in feet/second.

According to the method described here reflections of interest are tracked laterally according to stacking velocity on an analysis-by-analysis basis by using the times for these reflectors from the seismic profile to aid in the event identification on the velocity analysis. For each recorded event time and for each analysis a velocity is picked. Referring to FIG. 3, the velocities so obtained are first plotted separately for each reflection according to the analysis location. The horizontal axis of this plot consists of velocity analysis locations along the line of the survey. Velocity in feet per second plotted in the sense to show increase in a downward direction is then plotted vertically. This same procedure is undertaken for each reflection tracked on the profile. Plots thus obtained represent stacking velocity trends as picked for each reflector of interest.

Figure 4:
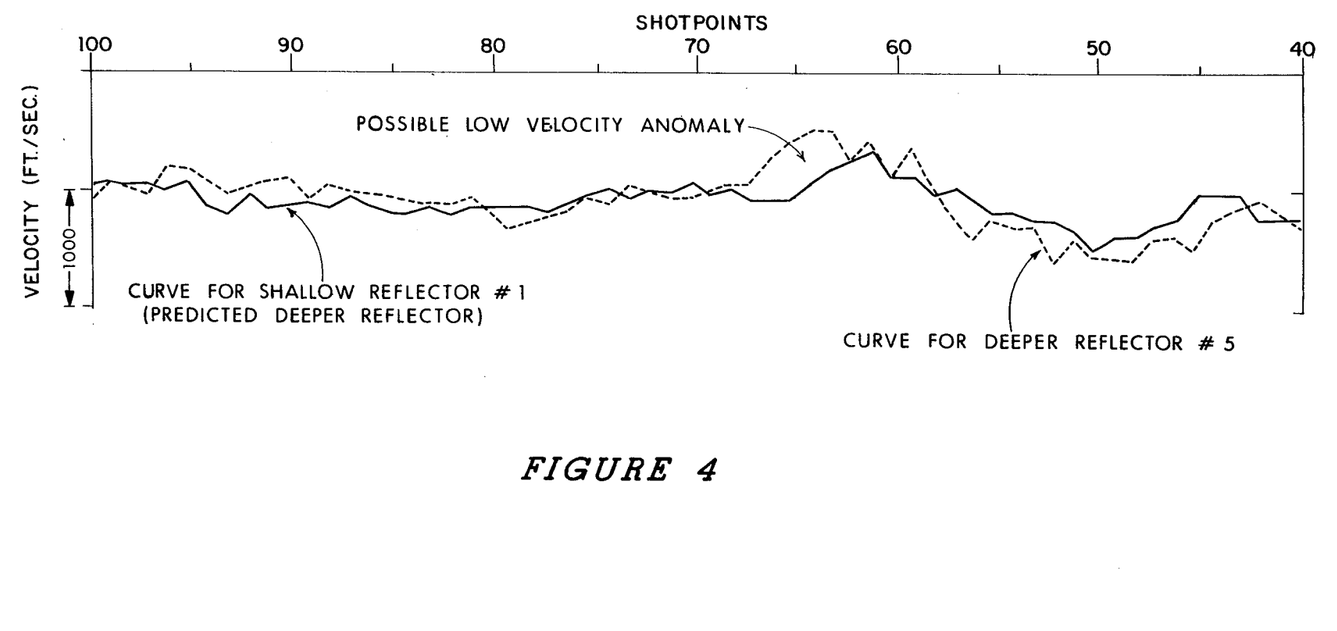
FIG. 4 represents an overlain pair of velocity curves for reflectors number 1 and number 5 of FIG. 1.

Referring to FIG. 4., each of the individual velocity plots is then overlain in pairs with all other velocity plots in order to effectively "bracket" all zones between reflections. This process may be viewed as predicting a deeper stacking velocity from the velocity curve of the shallower reflector assuming the interval between the two particular reflectors undergoing comparison is uniform, or varying only regionally in interval velocity. A semi-empirical alignment compensates for the possible development of discordant dip between the particular reflector pair. Plotted velocity values for the deeper of the two reflectors are connected with dashed straight lines for purposes of easy identification.

Any overlain curve pair under study should approximately follow one another if the lithology between them is uniform. Local changes in the intervening layers will result in their divergence or crossover. When the dashed predicted velocity curve for the deeper reflector approaches or crosses over the curve for the shallower event, this may be readily recognized on such display as a possible zone of anomalously low velocity. The word possible is necessary since the basic underlying data has a noise component which is rarely insignificant. Anomalous low velocity zones could indicate possible porosity and even hydrocarbons in appropriate circumstances.

The basic mathematical relations for a calibration procedure start with the Dix Equation as follows:

$$V_{int} = \sqrt{\frac{V_d^2 T_d - V_s^2 T_s}{T_d - T_s}} \qquad (1)$$

$V_d$ = velocity of the deeper reflection of a pair
$V_s$ = velocity of the shallower reflection of a pair
$T_d$ = time of the deeper reflection
$T_s$ = time of the shallower reflection
$V_{int}$ = interval velocity between reflection boundary pair This calculation is applied for any two reflections that are closely spaced (about 1000 feet or less). A velocity estimate for the interval between the two reflections being compared according to the Dix equation (loc. cit.) is made for every spatial velocity analysis location. The result is a set of "noisy" interval velocity values. Spatial running averages are then calculated across 3, 5, 9, and 15 terms and these are subsequently plotted laterally in a manner similar to the basic stacking velocities themselves (refer to FIG. 3). These averages help to identify and to eliminate some of the effects of noise which are ever present.

Yet another calculation based on a simple rearrangement of the Dix Equation is used to predict stacking velocities for the deeper of the two curves being compared from the shallower curve values and the smoothed interval velocity values. Specifically the Prediction Equation is:

$$V_d = \sqrt{\frac{V_s^2 T_s + \overline{V}_{int}^2 (T_d - T_s)}{T_d}}$$

$V_d$ = prediction of velocity of deeper reflection
$V_s$ = velocity of shallower reflection
$T_d$ = time of deeper reflection
$T_s$ = time of shallower reflection
$\overline{V}_{int}$ = average interval velocity Since the mechanics of the calculation rest again on the Dix Equation they therefore make use of the normal associated assumptions. This prediction calculation gives velocity values which might be expected was no local variations in the lithologic velocity between the two reflections being compared occur. Both the raw Dix interval velocities as previously discussed along with their smoothed values are used here. Calibration points are determined empirically from the comparison of the smoothed value plots and the predicted value plots. Such points are needed to determine empirically where the original velocity trend curves should be aligned for overlay and comparison.

Figure 5:
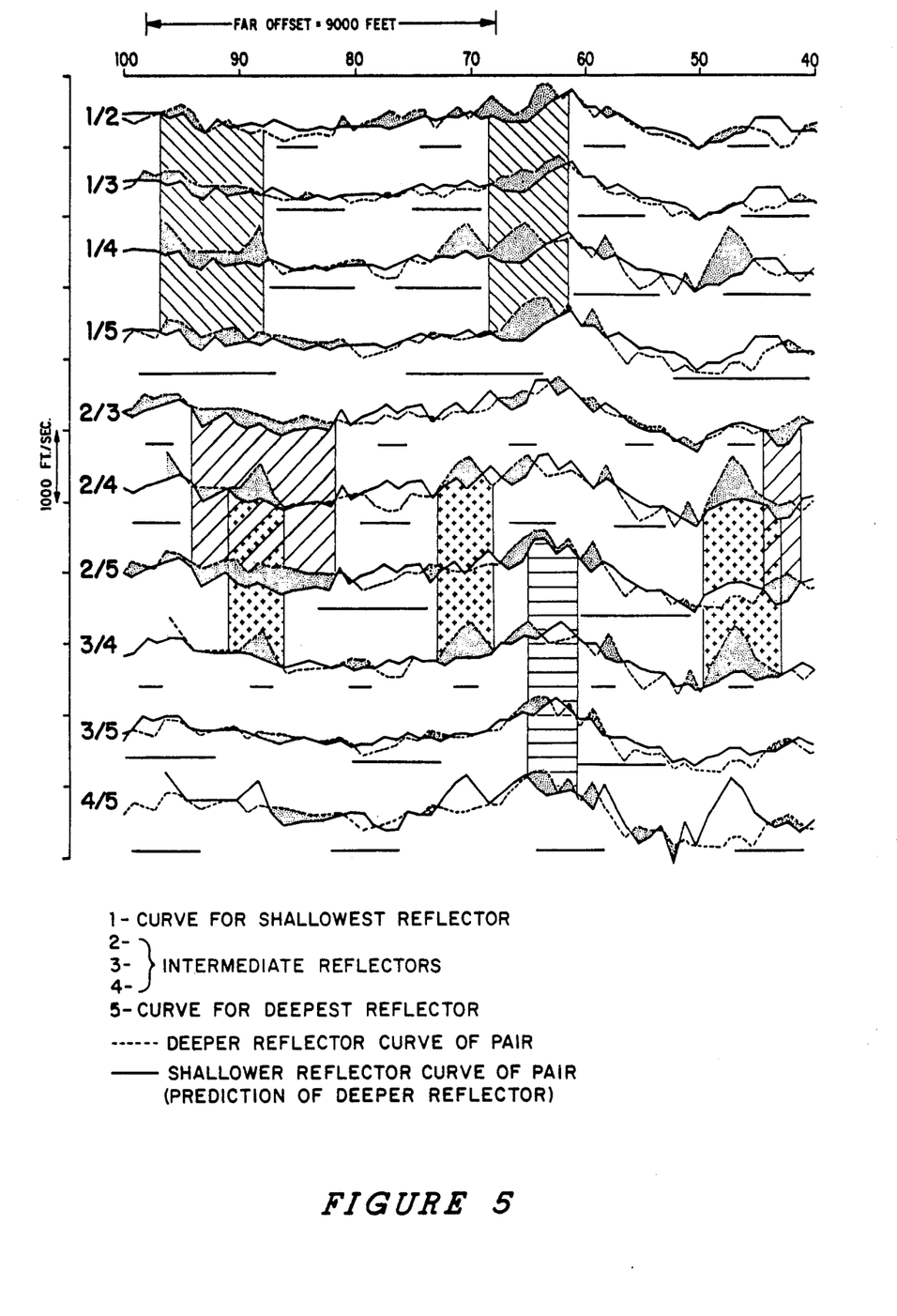
FIG. 5 represents a final display constructed to show all of the possible combinations of reflector velocity curves overlain in accordance with the method of this invention.

When all possible combinations of velocity trends are overlain according to the method described, a final display showing them all is constructed such as seen in FIG. 5. The horizontal and vertical scales for each curve pair are the same as described for FIGS. 3 and 4. All curve combination pairs are aligned beneath the proper surface reference positions on the display. The shallowest reflections are placed at the top of the presentation with comparisons in turn with deeper reflections taken in depth order. Then the next shallowest reflector is treated in similar fashion and so on. Places along the profile where the dashed line (deeper velocity values) rise above the solid line (shallower or predicted velocity values) denoting possible low velocities are colored pink or red for visual emphasis.

Where low velocity anomalies line up vertically and bracket a suspected low velocity zone in common, this is interpreted as strong corroboration of the reality of such anomaly. Vertical lines are now drawn to delineate the anomalous zone. The vertical band between such lines is color coded or coded graphically as shown in FIG. 5 according to the geologic interval in which the anomaly is thought to occur. The specific interval is in fact localized by the curve pair bracketing the narrowest interval within the vertical band of consistent low velocity indications. Vertical zones showing an anomaly in more than one geologic interval are codes with stripes corresponding to the colors of each intervals in which an anomaly in interpreted. For reference, the physical dimension of the far source-receiver offset for the particular seismic profile under analysis is placed to scale on the upper part of the display.

Figure 6:
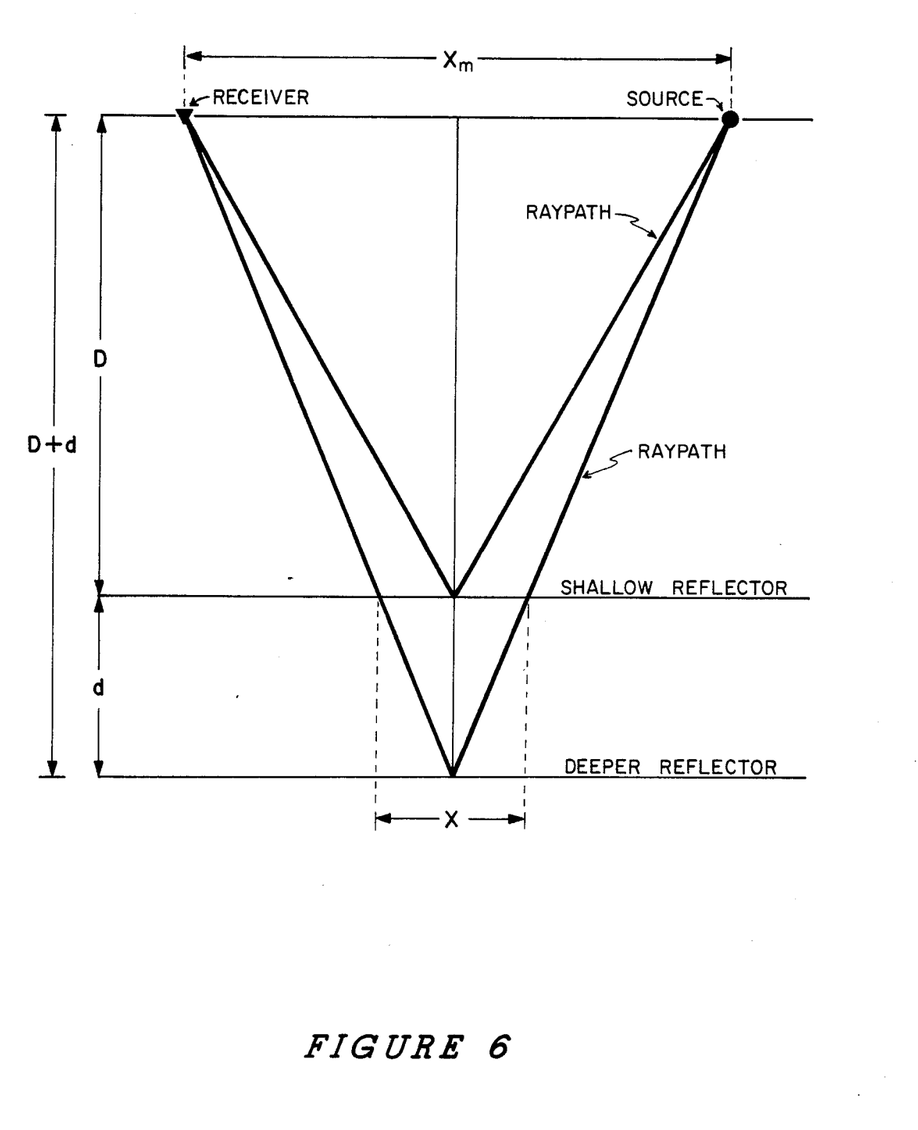
FIG. 6 is a graphical representation of the aperture calculation utilized in accordance with the method of this invention.

FIG. 6, is a diagram which relates to an "aperture" calculation where the raypaths from source to receiver for two reflectors are shown. Snell's law is ignored for the deeper reflector and the transit along the raypaths are taken as $V_1$ and $V_2$ respectively, where these are the stacking velocities. The aperture determines the limitations of the technique of this invention in resolving an anomaly according to the depth of the reflectors (and their corresponding depth interval or separation) and the maximum offset of the acquisition geometry used in the particular survey. The aperture is determined by a set of equations which encompasses several crude approximations. First, an interval thickness, d, between the two reflectors is estimated as follows from the two stacking velocities and the corresponding arrival times or, $$d = \frac{V_2 T_2 - V_1 T_1}{2} \quad (2)$$

next, the effective source-receiver offset, X, at depth, D, to the shallower reflector is determined using d from Equation (2) and the surface offset parameter $X_m$ and by similar triangles, $$\frac{\frac{X}{2}}{d} = \frac{\frac{X_m}{2}}{d+D}, \quad (3)$$

or $$X = \frac{dX_m}{d+D},$$

and finally $$X = X_m \left(1 - \frac{V_1 T_1}{V_2 T_2}\right)$$

All quantities and parameters are also noted in the simple model depicted in FIG. 6 and represent simple approximations of subsurface parameters. Anomalies in an interval of lateral extent less than that of the aperture cannot be deemed reliable since not all the raypaths of the CDP gather will consistently "see" it. The time/velocity pairs indicated for use in this equation ($V_1T_1$, $V_2T_2$) are averages for the particular reflection which as noted are crudely estimated from the stacking velocity analyses values. This calculation is done for each reflector combination on the final display and provides an important interpretive reference. A dashed horizontal line indicating the aperture is plotted to scale below each combination curve pair. Each dash in fact corresponds to the aperture dimension.

To summarize, a structural seismic section will show the topographic relief of the boundaries of rock formations in the subsurface. The display herein described is designed to show lateral variation of velocities which relate to properties of rocks and in particular porosity. Zones of anomalous low velocity and hence possible porosity should be easily recognized on the display by their vertical alignment, consistency, and the color codes. Such a display should aid in the detection of stratigraphic traps of oil and gas which result from the existence of porosity.

In its broad sense therefore, the invention involves a seismic method for identifying the presence of low velocity subsurface zones which might constitute hydrocarbon reservoirs. Broadly, the method constitutes the steps of first plotting velocity curves for a plurality of seismic reflections according to common depth point location. The velocity curves may be stacking velocities if desired. Each of the velocity curves is then overlain in best fit manner with all other velocity curves in turn. The overlain pairs are then analyzed for the purpose of identifying zones of consistent low velocity via consistent disparity of deeper velocity curves with shallower velocity curves bracketing a common zone. The consistent zones thus identified suggest the presence of low velocity in the subsurface formation.

More specifically, the seismic method of low velocity zone identification comprises marking reflections of interest on a stacked seismic profile, timing the reflections of interest by shot point and listing them and then plotting the listed times on the velocity analysis. Stacking velocities are then selected which correspond to the selected reflections, the stacking velocities being taken at the plotted times on the stacking velocity analyses. Stacking velocities are thus obtained on a shot point by shot point basis and seismic reflections of interest are tracked according to stacking velocity on an analysisby-analysis basis using the times from the reflections from the seismic profile.

Selected velocity curves are then plotted for each selected reflection and the velocity curves are overlain in best fit manner with each of the other velocity curves taken in turn for each selected reflection. A semi-empirical alignment is then conducted to compensate for possible development of discordant dip between the particular reflector pairs and the overlain pairs of velocity curves are arranged in order of depth, the overlain pairs of velocity curves defining low velocity disparity zones. An aperture equation is then applied giving an aperture dimension for each reflector pair and the resulting aperture length is then plotted on the display of overlain pairs for reference in confirming the reality of possible low velocity zones. The low velocity disparity zones are then colored to enhance the visual identity thereof and finally vertical lines are placed on the display to bracket zones of consistent low velocity disparity.

In cases where the overlain curves are within 250 msec. of one another a calculation is conducted to establish a more precise calibration.

We claim:

1. A seismic method for identifying the presence of subsurface low velocity zones comprising:
    (a) plotting velocity curves for a plurality of seismic reflections according to common depth point location;
    (b) overlaying each of said velocity curves in a best fit manner with all other velocity curves in turn; and
    (c) identifying zones of consistent low velocity disparity of deeper velocity curves with shallower velocity curves bracketing a common zone, said zones suggesting the presence of low velocity in the subsurface formation.

2. A seismic method as recited in claim 1, wherein said velocity curves are stacking velocity curves.

3. A method as recited in claim 1 wherein said best fit manner consists of calibrating the overlain curves when the curves are within 250 msec. of one another.

4. A seismic method for identifying the presence of low velocity subsurface zones comprising:
    (a) picking a velocity for each recorded reflection event time and for each velocity analysis;
    (b) separately plotting the velocities for each reflection event according to said analysis location, the velocity plots thus obtained representing velocity trends as picked for each reflector of interest;
    (c) overlaying each of the individual velocity plots in pairs in a best fit manner with all other velocity plots taken in turn to bracket zones between reflections;
    (d) conducting a semi-empirical alignment to compensate for possible development of discordant dip between the particular reflector pair;
    (e) identifying low velocity disparity zones for a predicted velocity curve for a deeper reflector and the actual velocity curve for said reflector;
    (f) developing a final graphical display with all curve combination pairs presented in order of depth; and
    (g) visually emphasizing places along the profile where velocity curves of deeper reflectors are in low velocity disparity with velocity curves from the shallower reflectors.

5. A method as recited in claim 4, wherein said velocity curves are stacking velocity curves and said overlaying said velocity pairs comprises:
    (a) plotting stacking velocity curves for each of the reflections of interest on a stacked seismic section; and
    (b) overlaying the stacking velocity curves with other stacking velocity curves in order of depth.

6. A method as recited in claim 4 wherein said interpreting comprises;
    (a) coloring areas defined by consistent velocity curve disparity for prediction of an intervening anomalous low velocity occurrence;
    (b) preparing an aperture calculation; and
    (c) plotting the aperture calculation in graphical form on the interpretive display for reference in confirming the predicted intervening anomalous low velocity occurrence.

7. A method as recited in claim 6, including:
    (a) confirming low velocity zones by their vertical alignment on said display; and
    (b) installing vertical lines on said display to bracket said low velocity zones.

8. A seismic method of identifying low velocity zones in the subsurface comprising:
    (a) estimating seismic velocities from a plurality of pairs of overlying reflectors, each said pair bracketing in common a possible low velocity zone; and
    (b) comparing from all of said pairs bracketing a common anomaly within said common zone to suggest consistent low velocity indications for said common zone as suggesting low velocity for said zone in the subsurface.

9. A seismic method for identifying low velocity subsurface zones which may be of reservoir quality, comprising;
    (a) marking reflections of interest on a stacked seismic profile;
    (b) timing the reflections of interest by common depth point basis and listing them;
    (c) plotting the times listed on the velocity analyses;
    (d) selecting stacking velocities that correspond to selected reflections, said stacking velocities being along the plotted times on the stacking velocity analyses;
    (e) obtaining stacking velocities on a shot point by shot point basis;
    (f) tracking seismic reflections of interest according to stacking velocity on an analysis-by-analysis basis using the times from said reflections from said seismic profile;
    (g) plotting selected velocity curves for each selected reflection;
    (h) overlaying in best fit manner each of the selected velocity curves with each of the other velocity curves taken in turn for each selected reflection;
    (i) conducting a semi-empirical alignment to compensate for possible development of discordance dip between the particular reflector pairs;
    (j) arranging overlain pairs of velocity curves in order of depth, the overlain pairs of velocity curves defining low velocity disparity zones;
    (k) preparing an aperture equation giving an aperture length for each reflector pair;
    (l) plotting the resulting aperture on the display of overlain pairs for reference in confirming the reality of possible low velocity zones,
    (m) coloring low velocity disparity zones to enhance the visual identity thereof; and
    (n) placing vertical lines on said display to bracket zones of consistent low velocity disparity.

10. A method as recited in claim 9 wherein said best fit manner consists of calibrating the overlain curves when the curves are within 250 msec. of one another.

11. A seismic method for identifying subsurface low velocity zones consisting of:
  (a) analyzing two selected reflectors which define an interval, a multiplicity of arrival times as functions of source to receiver separation of each said reflector being referred systematically to locations on the ground constituting an arrival time function, said analysis at each location predicting one said arrival time function from another using an assumed interval having no anomalous zones; and
  (b) identifying low velocity zones by prediction errors, said prediction errors at a ground location central to an anomaly having the sense of reduced travel time indicating higher velocities when predicting from the shallower reflector time function.

12. The method of claim 11 wherein said identified low velocity zones are confirmed by vertical alignment of said identifications for a plurality of reflector pairs all of which bracket said anomalous zone.

13. The method of claim 11 wherein said arrival times for a reflector as functions of source to receiver separation are a moveout curve.

14. The method of claim 13 wherein said identified low velocity zones are confirmed by vertical alignment of said identifications for a plurality of reflector pairs all of which bracket said anomalous zones.

* * * * *